United States Patent
Dixon et al.

(10) Patent No.: US 8,990,567 B2
(45) Date of Patent: *Mar. 24, 2015

(54) MESSAGE ORIGINATOR TOKEN VERIFICATION

(71) Applicant: International Business Machines Corporation, Armonk, NY (US)

(72) Inventors: Bret W. Dixon, South Perth (AU); Scot W. Dixon, South Perth (AU)

(73) Assignee: International Business Machines Corporation, Armonk, NY (US)

( * ) Notice: Subject to any disclaimer, the term of this patent is extended or adjusted under 35 U.S.C. 154(b) by 42 days.

This patent is subject to a terminal disclaimer.

(21) Appl. No.: 13/912,715

(22) Filed: Jun. 7, 2013

(65) Prior Publication Data

US 2014/0006778 A1    Jan. 2, 2014

Related U.S. Application Data

(63) Continuation of application No. 13/536,368, filed on Jun. 28, 2012.

(51) Int. Cl.
*H04L 9/32* (2006.01)
*H04L 29/06* (2006.01)
(Continued)

(52) U.S. Cl.
CPC .............. *H04L 63/123* (2013.01); *G06F 21/31* (2013.01); *H04L 63/0428* (2013.01);
(Continued)

(58) Field of Classification Search
CPC . H04L 63/08; H04L 63/0428; H04L 63/1416; H04L 63/123; H04L 9/3244; H04L 29/08099; H04L 63/1408; G06F 21/31

USPC ............... 713/161, 168, 170, 182; 726/5, 22; 709/225

See application file for complete search history.

(56) References Cited

U.S. PATENT DOCUMENTS 8,005,899 B2    8/2011   Cunningham
2004/0230797 A1*  11/2004  Ofek et al. .................... 713/168
(Continued)

OTHER PUBLICATIONS

United States Patent and Trademark Office, Office Action for U.S. Appl. No. 13/536,368, Sep. 6, 2013, pp. 1-20, Alexandria, VA, USA.
United States Patent and Trademark Office, Office Action for U.S. Appl. No. 13/536,368, Feb. 14, 2014, pp. 1-16, Alexandria, VA, USA.
United States Patent and Trademark Office, Office Action for U.S. Appl. No. 13/536,368, Jul. 25, 2014, pp. 1-7, Alexandria, VA, USA.
United States Patent and Trademark Office, Notice of Allowance for U.S. Appl. No. 13/536,368, Nov. 5, 2014, pp. 1-5, Alexandria, VA, USA.

*Primary Examiner* — Aravind Moorthy
(74) *Attorney, Agent, or Firm* — Lee Law, PLLC; Christopher B. Lee

(57) ABSTRACT

A digital signature of a message originator of a message is validated by a processor on message retrieval by a message recipient as a first-tier validation of the message. In response to a successful first-tier validation of the digital signature of the message originator, a transaction token and a message originator identifier are extracted from a message payload of the message. Communication is initiated with a verification service within a secure messaging environment of the message originator as a second-tier validation of the message using the extracted transaction token and the extracted message originator identifier to confirm whether the secure messaging environment of the message originator generated the transaction token and inserted the transaction token into the message payload. Results of the second-tier validation of the message with the verification service within the secure messaging environment of the message originator are determined.

8 Claims, 8 Drawing Sheets

(51) Int. Cl.
*G06F 21/00* (2013.01)
*G06F 7/04* (2006.01)
*G06F 12/14* (2006.01)
*G06F 15/173* (2006.01)
*G06F 21/31* (2013.01)
*H04L 29/08* (2006.01)

(52) U.S. Cl.
CPC ............ *H04L 63/1416* (2013.01); *H04L 63/08* (2013.01); *H04L 29/08099* (2013.01); *H04L 63/1408* (2013.01); *H04L 9/3244* (2013.01)
USPC ........... 713/168; 713/161; 713/170; 713/182; 726/5; 726/22; 709/225

(56) References Cited

U.S. PATENT DOCUMENTS

| | | |
|---|---|---|
| 2009/0106550 A1 | 4/2009 | Mohamed |
| 2009/0210708 A1 | 8/2009 | Chou |
| 2011/0167490 A1* | 7/2011 | Yung et al. ............. 726/22 |
| 2011/0213969 A1 | 9/2011 | Nakhjiri et al. |
| 2012/0204032 A1* | 8/2012 | Wilkins et al. ............. 713/170 |
| 2012/0331300 A1* | 12/2012 | Das et al. ............. 713/176 |
| 2013/0042115 A1* | 2/2013 | Sweet et al. ............. 713/176 |

* cited by examiner

MESSAGE ORIGINATOR TOKEN VERIFICATION

RELATED APPLICATIONS

This application is a continuation of and claims priority to and claims the benefit of U.S. patent application Ser. No. 13/536,368 titled "MESSAGE ORIGINATOR TOKEN VERIFICATION," which was filed in the United States Patent and Trademark Office on Jun. 28, 2012, and which is incorporated herein by reference in its entirety.

BACKGROUND

The present invention relates to messaging, such as within secure messaging environments. More particularly, the present invention relates to message originator token verification.

In message queuing environments, data messages or message transactions may be protected by digitally signing and/or encrypting messages. Secure messaging environments that sign and encrypt message data may use a Public Key Infrastructure (PKI) to uniquely identify senders and recipients in the system. Digital signatures allow recipients to determine whether a transaction message is from an authorized sender, and whether the certificate of the sender is trusted (e.g., issued by a trusted Certificate Authority (CA)) by the recipient's messaging environment. Encrypting message data ensures that only an intended recipient may view the message or transaction content.

BRIEF SUMMARY

A method includes validating, via a processor on message retrieval by a message recipient, a digital signature of a message originator of a message as a first-tier validation of the message; extracting, in response to a successful first-tier validation of the digital signature of the message originator, a transaction token and a message originator identifier from a message payload of the message; initiating, as a second-tier validation of the message with a verification service within a secure messaging environment of the message originator, communication with the verification service within the secure messaging environment of the message originator using the extracted transaction token and the extracted message originator identifier to confirm whether the secure messaging environment of the message originator generated the transaction token and inserted the transaction token into the message payload; and determining results of the second-tier validation of the message with the verification service within the secure messaging environment of the message originator.

A system includes a communication module and a processor programmed to: validate, on message retrieval by a message recipient, a digital signature of a message originator of a message as a first-tier validation of the message; extract, in response to a successful first-tier validation of the digital signature of the message originator, a transaction token and a message originator identifier from a message payload of the message; initiate, as a second-tier validation of the message with a verification service within a secure messaging environment of the message originator, communication via the communication module with the verification service within the secure messaging environment of the message originator using the extracted transaction token and the extracted message originator identifier to confirm whether the secure messaging environment of the message originator generated the transaction token and inserted the transaction token into the message payload; and determine results of the second-tier validation of the message with the verification service within the secure messaging environment of the message originator.

A computer program product includes a computer readable storage medium including computer readable program code, where the computer readable program code when executed on a computer causes the computer to validate, on message retrieval by a message recipient, a digital signature of a message originator of a message as a first-tier validation of the message; extract, in response to a successful first-tier validation of the digital signature of the message originator, a transaction token and a message originator identifier from a message payload of the message; initiate, as a second-tier validation of the message with a verification service within a secure messaging environment of the message originator, communication with the verification service within the secure messaging environment of the message originator using the extracted transaction token and the extracted message originator identifier to confirm whether the secure messaging environment of the message originator generated the transaction token and inserted the transaction token into the message payload; and determine results of the second-tier validation of the message with the verification service within the secure messaging environment of the message originator.

DETAILED DESCRIPTION

Figure 1:
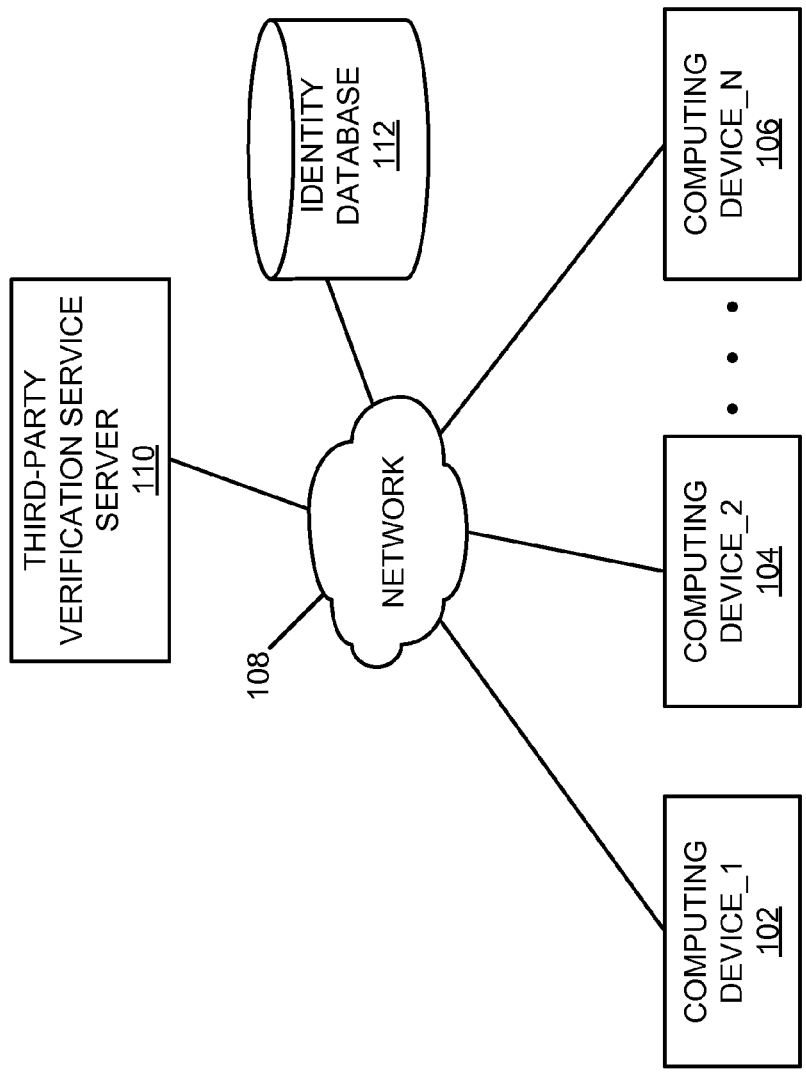
FIG. 1 is a block diagram of an example of an implementation of a system for automated message originator token verification according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides message originator token verification. The present subject matter provides for message originator verification within a secure messaging environment to guard against the introduction of unauthorized messages from unauthorized sources. An extension of the originator verification process is provided that adds a layer of communication with a message originator verification service of the message originator as a second tier of verification of the message in response to an otherwise successful first-tier validation of a digital signature. To implement the second-tier validation, on generation of a message, a transactional token is generated by the secure messaging environment of the message originator and added to the message payload. The message token is also stored locally for later verification purposes by the message originator verification service. On message retrieval, the transaction token and the originator identity are extracted from the message payload on the recipient side of the messaging transaction. The secure messaging environment of the recipient initiates verification processing with the message originator verification service of the identified message originator using the token to confirm that the message originator actually generated the message. As such, the present technology provides a multi-tier validation/verification of a message within a secure messaging environment.

To perform the verification processing with the message originator verification service of the identified originator, the secure messaging environment of the recipient either uses the message originator identity itself that was extracted from the received message to establish a connection back to the originator's system and the verification service on that system, or establishes a connection to a third-party verification service that, in turn, uses the originator identity to establish a connection back to the message originator's system and the verification service on that system. For both forms of verification processing, the transaction token is transmitted over the connection to the message originator's verification service.

Upon receipt of the token, the message originator's verification service performs a comparison of the received token with one or more locally-stored tokens and determines whether the message associated with the token was generated by the originator based upon whether the token is found within the local storage. A positive acknowledgement (ACK) is returned by the originator's verification service over the connection if the originator generated the token. A negative acknowledgement (NACK) is returned by the originator's verification service over the connection if the originator did not generate the token. On the recipient side of the messaging transaction, the transaction message is accepted on a positive acknowledgement, or rejected on negative acknowledgement.

As an extension to message originator verification processing, the present technology may utilize existing message security techniques, such as digital signing, to protect the integrity of transaction messages and to establish the identity of message originators. As such, existing messaging infrastructures may be modified to implement the present technology without changes to existing security techniques.

The transaction token is a unique identifier generated by the message originator, and may include any form of token appropriate for a given implementation. For example, the transaction token may include a hashed or encrypted sequence number, or other form of data element. The transaction token may be added to the message payload by the originator in association with the message being placed on an outgoing queue.

As described above, the token is also stored locally for later verification. Accordingly, by having the token stored locally to the message originator, intervention to corrupt the token may be managed/prevented by the secure messaging environment and data protection modules of the message originator. The verification service of the message originator may be considered the only entity authorized to verify the authenticity of the token in response to a verification request from a message recipient or a third-party verification service.

When the message is retrieved by an intended recipient, the secure messaging environment validates the digital certificate of the message originator and, if validated, extracts the token and the identity of the originator from the message payload. If the identity of the message originator is expected and trusted, the identity of the message originator is used to determine connection details to a system associated with that identity. The determination of the connection details may be performed, for example, from a policy configuration in the secure messaging environment of the message recipient, such as within an independent and separately-configured message repository (e.g., a database). Alternatively, the token and identity information may be passed to a third-party verification service that, in turn, determines connection details to a system associated with the identity. The determination of the connection details may also be performed, for example, from a policy configuration associated with a secure messaging environment of the third-party verification service, again within an independent and separately-configured message repository/database.

It should be noted that because the connection details for the message originators are configured separately/independently from the messages themselves, the present technology does not rely upon information within the messages themselves to derive the information used to communicate with the message originator to confirm the validity of the message. Further, the present technology does not utilize a centralized sender verification service for multiple message originators, but instead, each message originator maintains/stores its own transaction tokens for verification. As such, each recipient may communicate directly with each message originator or utilize a third-party verification service that communicates directly with each message originator to perform the transaction token validation.

For both forms of verification processing, the determined connection details may be used to establish a connection, such as a secure socket layer/transport layer security (SSL/TLS) connection, from the retrieving system or third-party verification system to the system associated with the determined identity of the message originator. The verification service of the message originator may be configured to accept and respond to connection requests. Once a connection is established, the secure messaging environment of either the recipient or the third-party verification service transmits the transaction token, and any other relevant data associated with the transaction message, over the connection to the verification service of the message originator.

The verification service of the message originator that receives the transmitted token validates the token to verify that it was generated by the originator. If so, the service acknowledges over the connection that the token is valid, and the secure messaging environment accepts the transaction message as valid. If the service indicates that the token was not generated by the originator, the secure messaging environment of the message recipient rejects the transaction message as invalid.

As such, the present technology provides message originator verification processing within a secure messaging environment that is strengthened to guard against the introduction of unauthorized messages from unauthorized sources. Existing secure messaging environments may be unaffected by the introduction of the present technology because the embedded transaction token may be considered optional/configurable to a high degree of granularity across a system or systems. The introduction of the present technology also does not affect application programs because the insertion and verification of the transaction token may be managed by the respective secure messaging environments.

It should be noted that conception of the present subject matter resulted from recognition of certain limitations associated with verification of the validity of messages, such as within secure messaging environments. For example, it was observed that even if a secure messaging environment adopts the latest and strongest algorithms and cryptographic techniques, there is a possibility that message security may be compromised by a security breach. It was further determined that, while a certificate of an originator may be verified by checking that the certificate was issued (and therefore signed) by a trusted certificate issuer or certificate authority (CA), in the case of a catastrophic compromise, for example where a private key has been compromised, these checks are insufficient to guard a secure messaging environment from unauthorized message insertion/introduction into the system. As such, it was further determined that while recipients of messages may determine whether a transaction message was allegedly originated by/from an "authorized" sender using a digital certificate, there is no way to verify that the authorized sender actually originated the particular message. As a result, a security compromise within a secure messaging environment may allow a message transaction to be introduced into the secure messaging environment from an unauthorized source, and previously available safeguards may not detect such an unauthorized message introduction into the secure messaging environment. In such a situation, it was determined that, in spite of a secure environment where messages are required to be digitally signed to verify they are from an expected and trusted source, there exists a possibility within systems prior to the previous technology that an unauthorized message may be introduced that gives the appearance of a known and trusted sender. It was additionally observed that for systems that utilize a centralized sender verification service, a compromised Public Key Infrastructure (PKI) identity may be able to register information records with the centralized sender verification service. As a result, it was determined that, in order to prevent such unauthorized intervention, message originator information may be implemented independently of the messaging itself and independently of a centralized verification service.

The present technology improves message originator verification by providing for message originator token verification, as described above and in more detail below. The present technology may be used to confirm with the presumed message originator that the message was actually originated by that entity. As such, the present technology solves the problem of compromised PKI identities that may pass a first-tier validation of the digital signature by implementing a second-tier validation with the message originator using independently-configured communication details for the message originator rather than using communication details within the messages themselves (that may also be compromised). The present technology also utilizes independently-configured connection detail information for message originators that is stored locally to the respective entity that is attempting to communicate with the message originator to prevent unauthorized tampering with the connection detail information. Accordingly, improved message origination validation may be obtained by use of the subject matter described herein.

The message originator token verification described herein may be performed in real time to allow prompt verification of tokens generated by a message originator. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for automated message originator token verification. A computing device_1 102 through a computing device_N 106 communicate via a network 108 with one another for messaging interactions, also termed message transactions herein. The computing device_1 102 through the computing device_N 106 may each be configured to implement message originator token verification, as described above and in more detail below. A third-party verification service server 110 may alternatively be used to perform message originator token verification for one or more of the computing device_1 102 through the computing device_N 106, as appropriate for the particular configuration of each of the respective computing devices.

One or more identity repositories (e.g., databases, pre-configured files, etc.) represented generally as an identity database 112 may be utilized by the respective computing device_1 102 through the computing device_N 106 to identify connection details for a message originator of any particular received message. Additionally and/or alternatively, the one or more identity databases represented generally as the identity database 112 may be utilized by the respective computing device_1 102 through the computing device_N 106 to identify connection details for the third-party verification service server 110 and use this connection information to establish a connection with the third-party verification service server 110 to request the third-party verification service server 110 to perform the message originator token verification described herein. In such an implementation, the third-party verification service server 110 may utilize the same or a different identity database, such as the identity database 112, to identify connection details for a message originator of any particular received message on behalf of the respective computing device(s) to perform the requested verification of the token with the presumed message originator. Again, as with message originator communication details, it should be noted that, because the connection details for the third-party service are configured separately from the message itself, the present technology does not rely upon information within the message itself to derive the information used to communicate with the third-party service to confirm validity of the message.

While the identity database 112 is shown as a network-connected device within FIG. 1, this should not be considered limiting. As shown and described in association with FIG. 2 below, a separate and distinct identity database, such as the identity database 112, may be associated with each of the respective devices shown within FIG. 1 to facilitate access to different connection information used by the respective devices.

It should be noted that the configuration of FIG. 1 is one possible example of a system implementation and many variations of system implementations are possible. However, for purposes of clarity with respect to the present example, any device within the system 100 may operate locally or remotely with respect to any other device. Further, when running locally there is no cross-network involved between the respective local devices.

As such, and as will be described in more detail below in association with FIG. 2 through FIG. 8, the computing device_1 102 through the computing device_N 106 and the third-party verification service server 110 provide automated message originator token verification. The automated message originator token verification is based upon communication with message originators identified within received messages to confirm that the identified message originator actually generated and sent the message. Accordingly, messages introduced into a secure messaging environment by entities other than authorized message originators may be identified and rejected, thereby improving messaging security within a system, such as the system 100.

The automated message originator token verification may be facilitated by a data protection service/module that interfaces between a requester device/application and a responder device/application. A queue manager application may also process queue management functionality at the direction of the data protection service/module. For purposes of brevity within the present description, the data protection service/module may be referred to herein as a data protection module. It is understood that one or more data protection modules may be utilized to implement the present subject matter as appropriate for a given implementation.

It should be noted that the computing device_1 102 through the computing device_N 106, and/or the third-party verification service server 110, may be a portable computing device, either by a user's ability to move the respective device to different locations, or by the respective device's association with a portable platform, such as a plane, train, automobile, or other moving vehicle. It should also be noted that the computing device_1 102 through the computing device_N 106 and the third-party verification service server 110 may be any computing device capable of processing information as described above and in more detail below. For example, any of the respective computing devices may include devices such as a mainframe computer, a distributed computing device within a distributed network of computing devices, a personal computer (e.g., desktop, laptop, etc.) or a handheld device (e.g., cellular telephone, personal digital assistant (PDA), email device, music recording or playback device, etc.), or any other device capable of processing information as described in more detail below.

The network 108 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
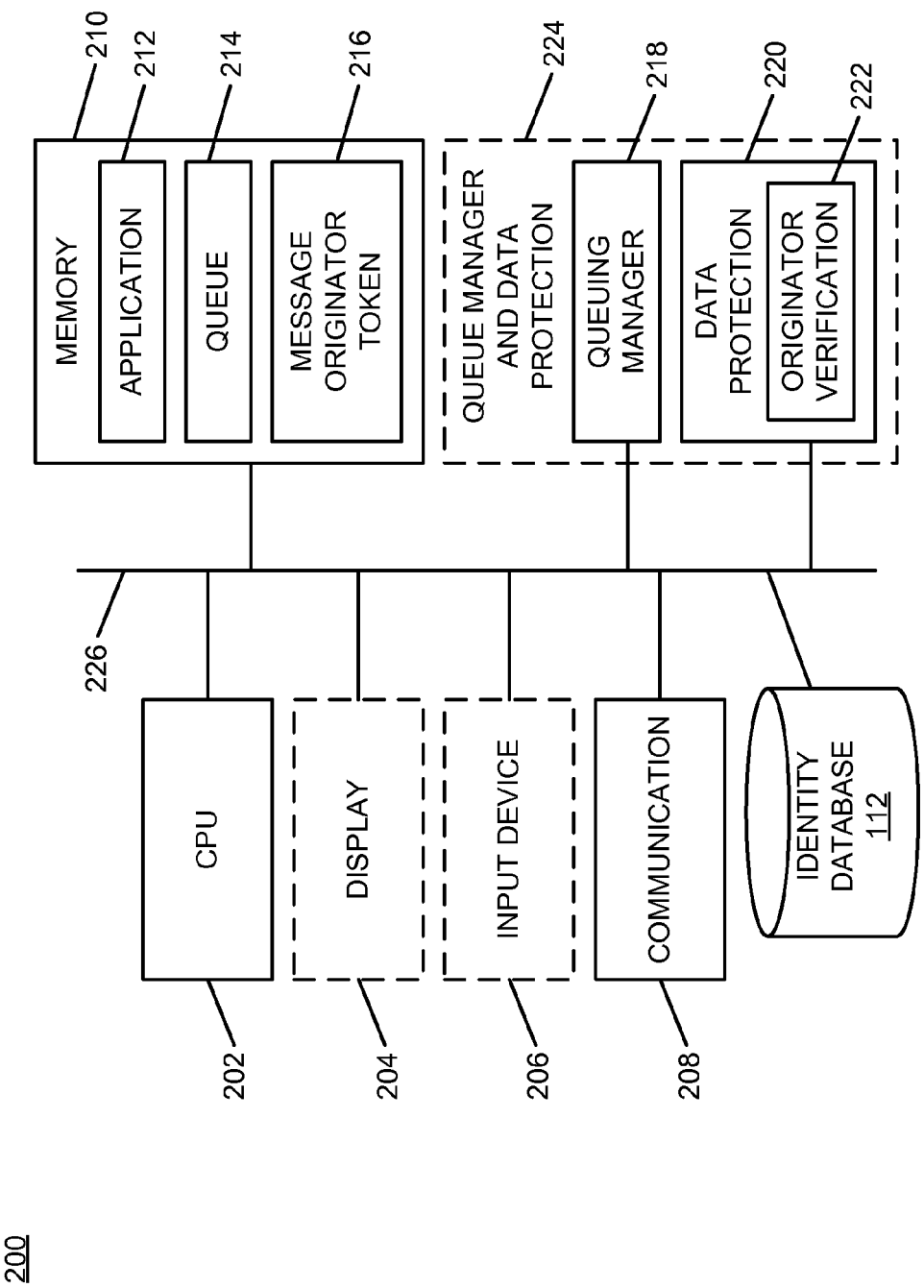
FIG. 2 is a block diagram of an example of an implementation of a core processing module capable of performing automated message originator token verification according to an embodiment of the present subject matter.

FIG. 2 is a block diagram of an example of an implementation of a core processing module 200 capable of performing automated message originator token verification. The core processing module 200 may be associated with the computing device_1 102 through the computing device_N 106 and/or the third-party verification service server 110, as appropriate for a given implementation. Further, the core processing module 200 may provide different and complementary processing of message originator token verification in association with each implementation, as described in more detail below.

As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations. Accordingly, the core processing module 200 may operate as a completely automated embedded device without direct user configurability or feedback. However, the core processing module 200 may also provide user feedback and configurability via the display 204 and the input device 206, respectively.

A communication module 208 provides interconnection capabilities that allow the core processing module 200 to communicate with other modules within the system 100. The communication module 208 may include any electrical, protocol, and protocol conversion capabilities useable to provide the interconnection capabilities.

A memory 210 includes an application area 212, a queue storage area 214, and a message originator token storage area 216. The application area 212 represents storage and execution space for one or more applications, such as one or more message originator applications and/or one or more message recipient applications. The queue storage area 214 stores queues that may include one or more sending queues (e.g., request queues) and one or more response queues (e.g., reply queues).

The message originator token storage area 216 stores message tokens generated by message originators for message originator implementations of the core processing module 200. The message originator token storage area 216 stores message tokens and message originator identifiers extracted from messages received by message recipients for message recipient implementations of the core processing module 200.

It is understood that the memory 210 may include any combination of volatile and non-volatile memory suitable for the intended purpose, distributed or localized as appropriate, and may include other memory segments not illustrated within the present example for ease of illustration purposes.

For example, the memory 210 may include a code storage area, an operating system storage area, a code execution area, and a data area without departure from the scope of the present subject matter.

A queuing manager 218 provides queue management processing for the core processing module 200, such as placement of messages onto and retrieval of messages from queues stored within the queue storage area 214, as described above. A data protection module 220 is also shown. The data protection module 220 includes an originator verification module 222 that implements the automated message originator token verification of the core processing module 200. The data protection module 220 intercepts messaging, such as sent/request messages or response/reply messages, from message originators (e.g., requester applications or responder applications, respectively) that may be executing locally within the application area 212 or remotely at another device.

The originator verification module 222 generates and stores message tokens for messages originated by a given message originator for later verification. The originator verification module 222 additionally processes requests to verify tokens against previously-generated and stored tokens, as described above and in more detail below, to verify that messages that allegedly originated from particular message originators are authentic messages actually generated by the respective message originators.

It is additionally noted that a queue manager and data protection module 224 is illustrated via a dashed-line representation within FIG. 2. The queue manager and data protection module 224 is shown to include both the queuing manager 218 and the data protection module 220, and is illustrated by a dashed-line representation to indicate that the queuing manager 218 and the data protection module 220 may be implemented within a single module as appropriate for the given implementation.

It should also be noted that the queuing manager 218 and the data protection module 220 (and also the queue manager and data protection module 224) may form a portion of other circuitry described without departure from the scope of the present subject matter. Further, these modules may alternatively be implemented as an application stored within the memory 210. In such an implementation, these modules may include instructions executed by the CPU 202 for performing the functionality described herein. The CPU 202 may execute these instructions to provide the processing capabilities described above and in more detail below for the core processing module 200. These modules may form a portion of an interrupt service routine (ISR), a portion of an operating system, a portion of a browser application, or a portion of a separate application without departure from the scope of the present subject matter.

The identity database 112 is also shown associated with the core processing module 200 within FIG. 2 to show that the identity database 112 may be coupled to the core processing module 200 without requiring external connectivity, such as via the network 108.

The CPU 202, the display 204, the input device 206, the communication module 208, the memory 210, the queuing manager 218, the data protection module 220, the queue manager and data protection module 224, and the identity database 112 are interconnected via an interconnection 226. The interconnection 226 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

Figure 3:
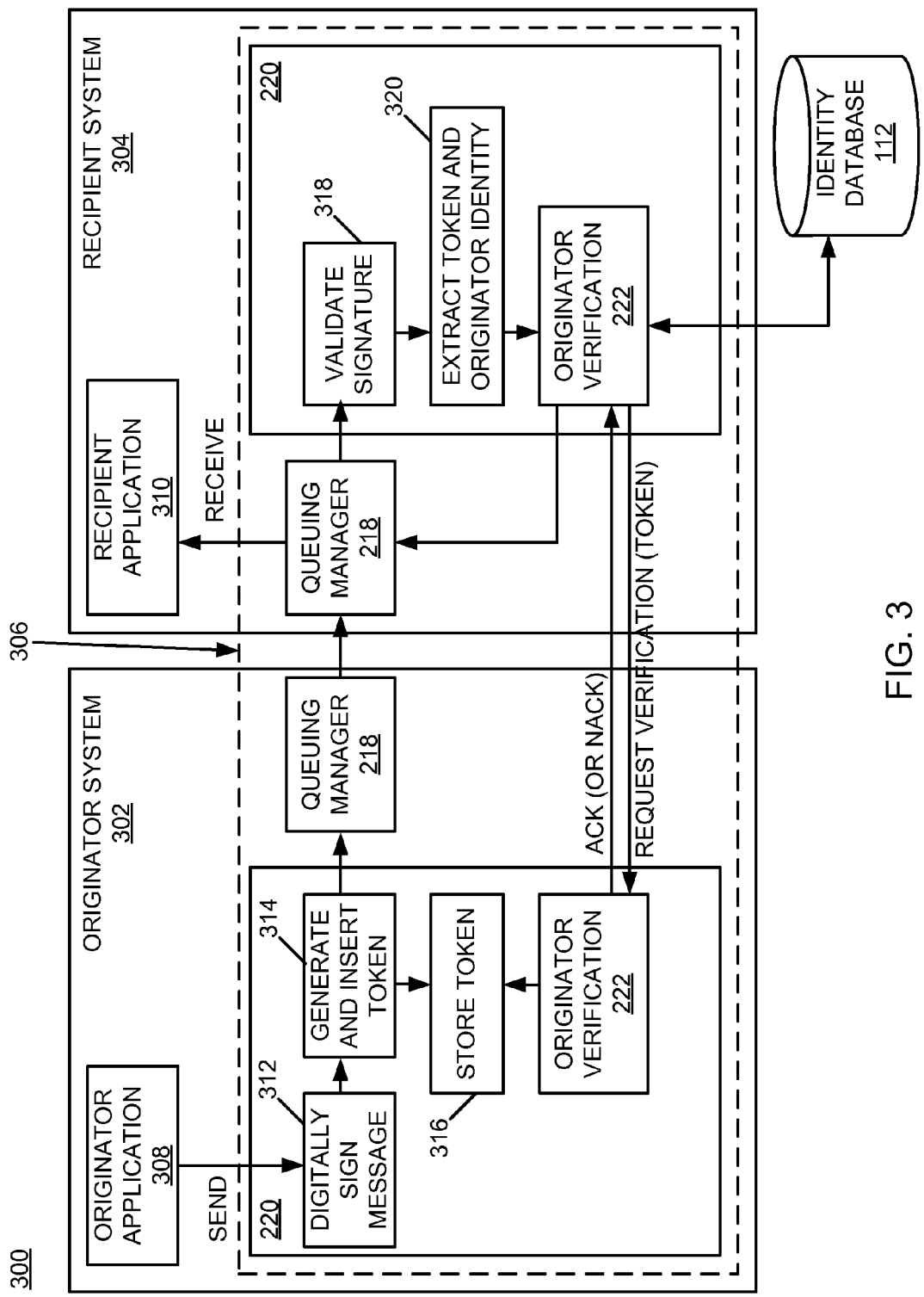
FIG. 3 is a block architectural, message flow, and processing diagram of an example of an implementation of a message originator verification sequence using automated message originator token verification by a message recipient according to an embodiment of the present subject matter.
Figure 4:
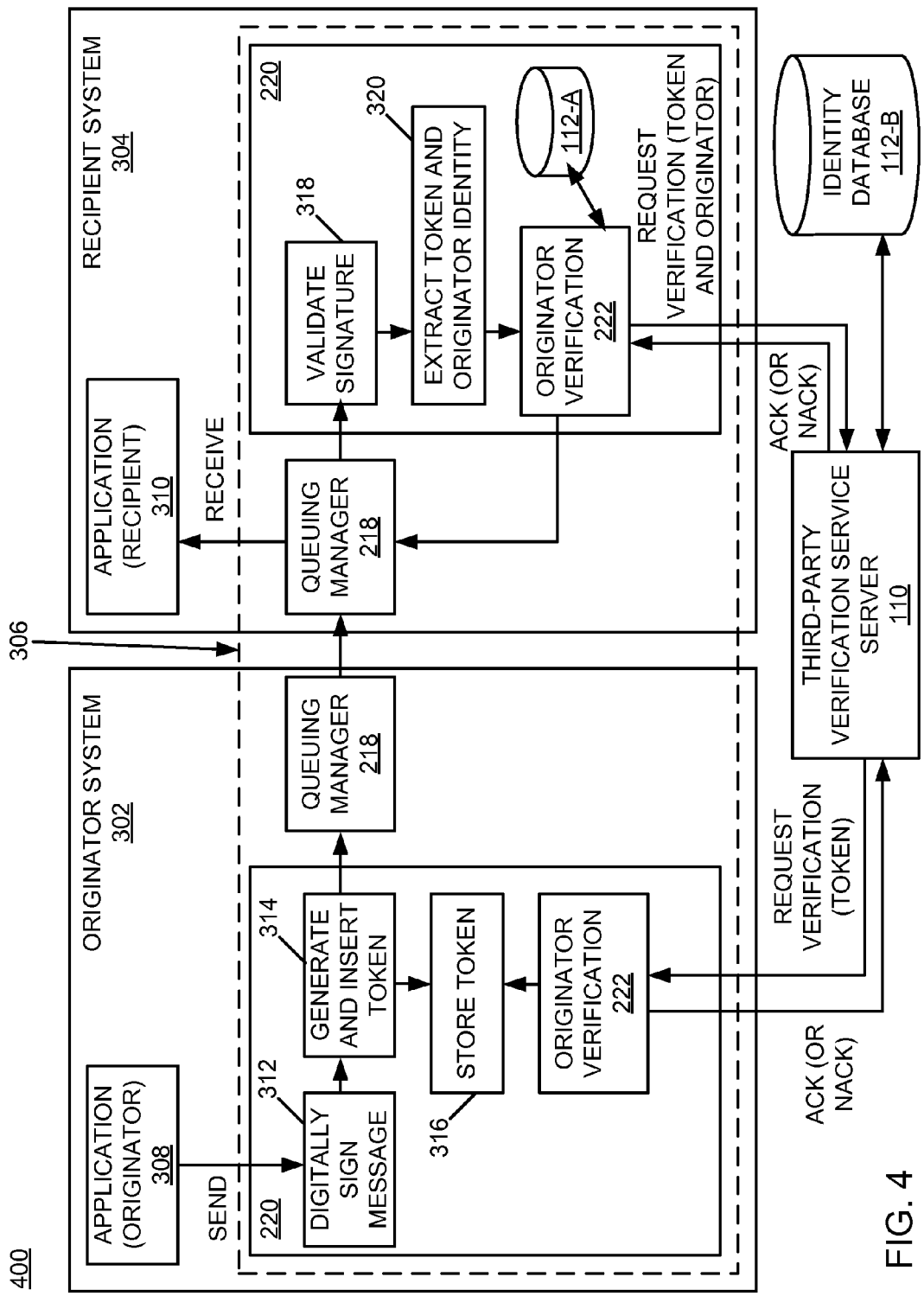
FIG. 4 is a block architectural, message flow, and processing diagram of an example of an implementation of a message originator verification sequence using automated message originator token verification via a third-party service according to an embodiment of the present subject matter.

FIG. 3 through FIG. 4 described below represent example architectural block diagrams that include messaging interactions between message originators and message recipients to illustrate examples of direct message originator verification by a message recipient and indirect message originator verification by a third-party service, respectively. Many variations on the example messaging interactions described herein are possible and all are considered within the scope of the present subject matter.

FIG. 3 is a block architectural, message flow, and processing diagram of an example of an implementation of a message originator verification sequence 300 using automated message originator token verification by a message recipient. An originator system 302 communicates with a recipient system 304. A secure messaging environment 306 processes messaging between the originator system 302 and the recipient system 304.

An originator application 308 within the originator system 302 initiates transmission (SEND) of a message to a recipient application 310 within the recipient system 304. Within the present example, the queuing manager 218, the data protection module 220, and the originator verification module 222 are each illustrated as separate components in association with each of the originator system 302 and the recipient system 304. As such, the present example may be implemented in association with two computing devices, such as the computing device_1 102 and the computing device_2 104. However, it is understood that the present example applies at least equally to messaging between two applications on the same device without departure from the scope of the present subject matter. Accordingly, the respective queuing managers 218, the respective data protection modules 220, and the respective originator verification modules 222 may be the same physical modules within such implementations. The identity database 112 is also illustrated within FIG. 3 in association with the recipient system 304, and specifically with the originator verification module 222 of the recipient system 304. It should be noted, as described above, that the identity database 112 may be network connected or locally connected to the recipient system 304.

Within FIG. 3, an originator application 308 within the originator system 302 introduces a message (SEND) into the secure messaging environment 306 intended for a recipient application 310 within the recipient system 304. The secure messaging environment 306 digitally signs the message to protect the integrity of the message and adds a signature that identifies the originator application 308 to the message payload at block 312. The secure messaging environment 306 generates and adds a transaction token to the payload and delivers the message to the queuing manager 218 at block 314. The secure messaging environment 306 also stores the generated transaction token within a secure token store, such as the message originator token storage area 216 of the memory 210, for later verification at block 316. The queuing manager 218 within the originator system 302 either stores the message locally on a queue, or transmits the message to another queuing manager, such as the queuing manager 218 of the recipient system 304, if the message destination is remote.

The recipient application 310 attempts to retrieve the message from the queuing manager 218 of the recipient system 304. The attempt to retrieve the message by the recipient application 310 initiates message originator verification processing within the secure messaging environment 306. The data protection module 220 of the recipient system 304 begins the message verification processing by validating the digital signature within the message payload at block 318. Presuming for purposes of the present example that the digital signature is valid, the data protection module 220 of the recipient system 304 extracts the transaction token and an originator identity from the message at block 320. Within a PKI environment, the identity may include, for example, the distinguished name (DN) of the certificate that hosts the public key used to verify the digital signature.

The secure messaging environment 306 then passes the transaction token and originator identity to a verification service, implemented within the present example as the originator verification module 222 of the recipient system 304, in order to verify that the transaction token is legitimate, which, if legitimate, indicates that the message was actually sent by the originator application 308. The originator verification module 222 of the recipient system 304 may use the identity database 112 to determine connection details for the message originator's verification system, as implemented within the present example as the originator verification module 222 of the originator system 302. For example, the identity database 112 may associate an internet protocol (IP) address and port number with the identity of the message originator and this information may be utilized to establish a connection with the originator verification module 222 of the originator system 302.

A connection, such as for example an SSL/TLS socket connection, may be established with the originator verification module 222 of the originator system 302 and the token and any accompanying information useable for verification purposes may be transmitted over the connection to the originator verification module 222 of the originator system 302 (e.g., REQUEST VERIFICATION (TOKEN)).

In response to receipt of the verification request, the originator verification module 222 of the originator system 302 may determine whether the received transaction token is a transaction token generated by the data protection module 220 of the originator system 302 by comparing the received transaction token with tokens stored previously within the message originator token storage area 216 of the memory 210 to verify that the received transaction token matches a previously-stored transaction token. If a matching transaction token is found, the originator verification module 222 of the originator system 302 returns a positive acknowledgement (e.g., ACK) over the connection. If a matching transaction token is not found, the originator verification module 222 of the originator system 302 returns a negative acknowledgement (e.g., NACK) over the connection. In response to receiving an acknowledgement (ACK), the secure messaging environment 306, and specifically the originator verification module 222 of the recipient system 304, processes the message according to the acknowledgement. Assuming all other verification checking is successful, a positive acknowledgement (ACK) will result in the authenticated message being delivered to the recipient application 310. Alternatively, a negative acknowledgment (NACK) or other verification checking failure may result in an error message being returned to the recipient application 310. As such, the message originator token verification described herein may be utilized to improve verification processing for messages within messaging environments.

FIG. 4 is a block architectural, message flow, and processing diagram of an example of an implementation of a message originator verification sequence 400 using automated message originator token verification via a third-party service. As with FIG. 3 described above, the originator system 302 communicates with the recipient system 304. A secure messaging environment 306 processes messaging between the originator system 302 and the recipient system 304.

As also with the example of FIG. 3, the originator application 308 within the originator system 302 initiates transmission (SEND) of a message to the recipient application 310 within the recipient system 304. As also described above within the example of FIG. 3, within the present example, the queuing manager 218, the data protection module 220, and the originator verification module 222 are each illustrated as separate components in association with each of the originator system 302 and the recipient system 304. As such, the present example may be implemented in association with two computing devices, such as the computing device_1 102 and the computing device_2 104. However, it is understood that the present example applies at least equally to messaging between two applications on the same device without departure from the scope of the present subject matter. Accordingly, the respective queuing managers 218, the respective data protection modules 220, and the respective originator verification modules 222 may be the same physical modules within such implementations.

However, relative to the example of FIG. 3, two identity databases, an identity database 112-A and an identity database 112-B are illustrated within FIG. 4. The identity database 112-A is illustrated in association with the recipient system 304, and specifically with the originator verification module 222 of the recipient system 304. The identity database 112-B is illustrated in association with the third-party verification service server 110. It should be noted, as described above, that the identity database 112-A and the identity database 112-B may be network connected or locally connected to the respective systems.

Within FIG. 4, the originator application 308 within the originator system 302 again introduces a message (SEND) into the secure messaging environment 306 intended for a recipient application 310 within the recipient system 304. The secure messaging environment 306 digitally signs the message to protect the integrity of the message and adds a signature that identifies the originator application 308 to the message payload at block 312. The secure messaging environment 306 generates and adds a transaction token to the payload and delivers the message to the queuing manager 218 at block 314. The secure messaging environment 306 also stores the generated transaction token within a secure token store, such as the message originator token storage area 216 of the memory 210, for later verification at block 316. The queuing manager 218 within the originator system 302 either stores the message locally on a queue, or transmits the message to another queuing manager, such as the queuing manager 218 of the recipient system 304, if the message destination is remote.

The recipient application 310 attempts to retrieve the message from the queuing manager 218. The attempt to retrieve the message by the recipient application 310 initiates message verification processing within the secure messaging environment 306. The data protection module 220 of the recipient system 304 begins the message verification processing by validating the digital signature within the message payload at block 318. Presuming for purposes of the present example that the digital signature is valid, the data protection module 220 of the recipient system 304 extracts the transaction token and an originator identity from the message at block 320. Within a PKI environment, the identity may include, for example, the distinguished name (DN) of the certificate that hosts the public key used to verify the digital signature.

The secure messaging environment 306 then passes the transaction token and originator identity to a verification service, implemented within the present example as the originator verification module 222 of the recipient system 304, in order to verify that the transaction token is legitimate, which, if legitimate, indicates that the message was actually sent by the originator application 308. Within the present example, as differentiated from the example of FIG. 3 described above, the originator verification module 222 may use the identity database 112-A to determine connection details for the third-party verification service server 110. For example, the identity database 112-A may associate an internet protocol (IP) address and port number with the identity of the third-party verification service server 110 and this information may be utilized to establish a connection with the third-party verification service server 110.

A connection, such as for example an SSL/TLS socket connection, may be established with the third-party verification service server 110 and the token, originator identity, and any accompanying information useable for verification purposes may be transmitted over the connection to the third-party verification service server 110 (e.g., REQUEST VERIFICATION (TOKEN AND ORIGINATOR)).

In response to receipt of the verification request, third-party verification service server 110 may use the identity database 112-B to determine connection details of the message originator's verification system, as implemented within the present example as the originator verification module 222 of the originator system 302. For example, an identity database, such as the identity database 112-B, may associate an internet protocol (IP) address and port number with the identity of the message originator and this information may be utilized to establish a connection with the originator verification module 222 of the originator system 302.

A connection, for example an SSL/TLS socket connection, may be established with the originator verification module 222 of the originator system 302 and the token and any accompanying information useable for verification purposes may be transmitted over the connection to the originator verification module 222 of the originator system 302 (e.g., REQUEST VERIFICATION (TOKEN)).

The originator verification module 222 of the originator system 302 may determine whether the received transaction token is a transaction token generated by the data protection module 220 of the originator system 302 by comparing the received transaction token with tokens stored previously within the message originator token storage area 216 of the memory 210 to verify that the received transaction token matches a previously-stored transaction token. If a matching transaction token is found, the originator verification module 222 of the originator system 302 returns a positive acknowledgement (e.g., ACK) over the connection to the third-party verification service server 110. If a matching transaction token is not found, the originator verification module 222 of the originator system 302 returns a negative acknowledgement (e.g., NACK) over the connection to the third-party verification service server 110. The third-party verification service server 110 forwards the positive acknowledgment or the negative acknowledgment to the originator verification module 222 of the recipient system 304.

In response to receiving an acknowledgement (ACK), the secure messaging environment 306, and specifically the originator verification module 222 of the recipient system 304, processes the message according to the acknowledgement. Assuming all other verification checking is successful, a positive acknowledgement (ACK) will result in the authenticated message being delivered to the recipient application 310. Alternatively, a negative acknowledgment (NACK) or other verification checking failure may result in an error message being returned to the recipient application 310. As such, the message originator token verification described herein may be utilized to improve verification processing for messages within messaging environments with the assistance of a third-party verification service, such as the third-party verification service server 110.

FIG. 5 through FIG. 8 described below represent example processes that may be executed by devices, such as the core processing module 200, to perform the automated message originator token verification associated with the present subject matter. Many other variations on the example processes are possible and all are considered within the scope of the present subject matter. The example processes may be performed by modules, such as the originator verification module 222 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

Figure 5:
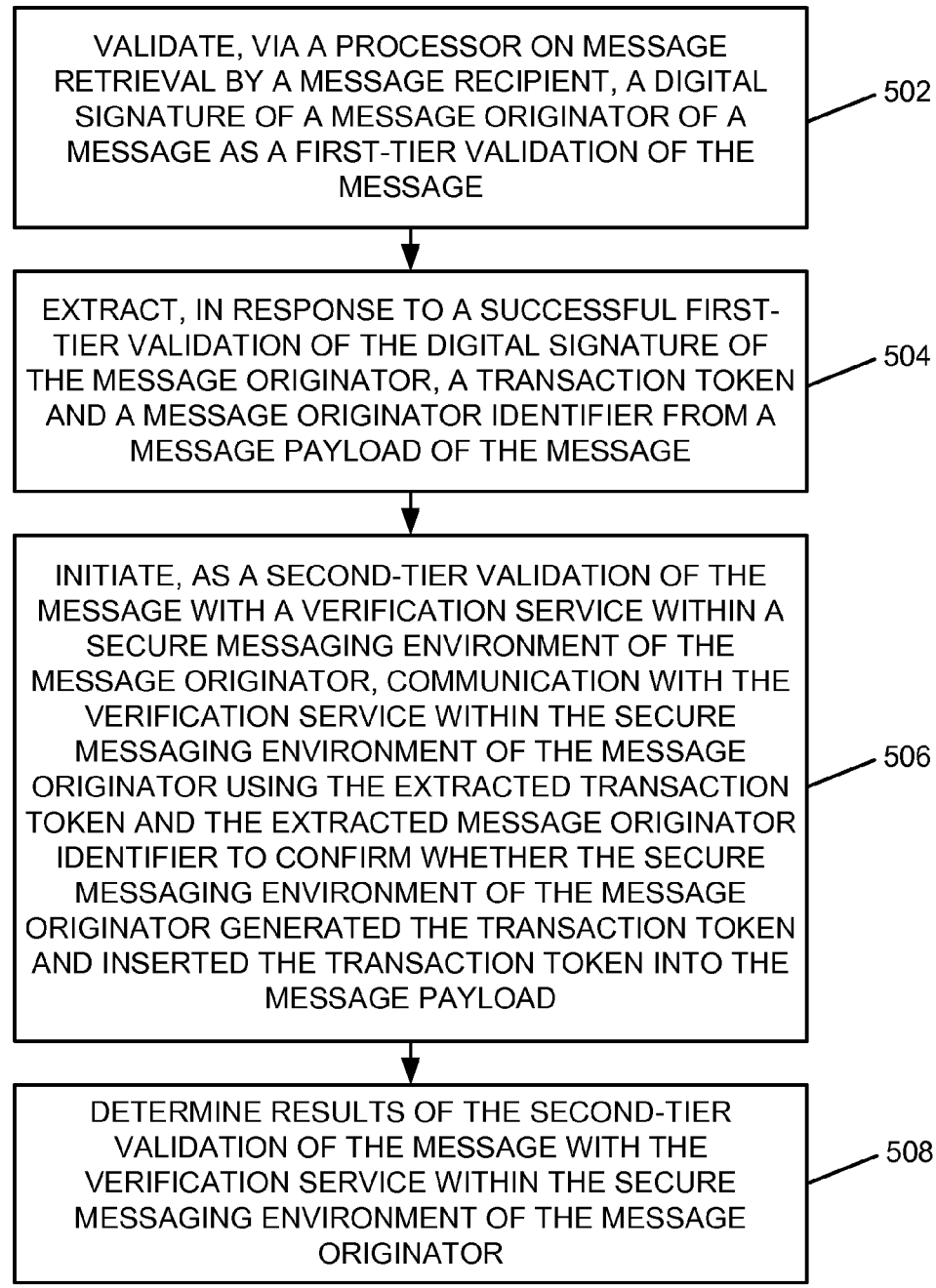
FIG. 5 is a flow chart of an example of an implementation of a process for automated message originator token verification according to an embodiment of the present subject matter.

FIG. 5 is a flow chart of an example of an implementation of a process 500 for automated message originator token verification. At block 502, the process 500 validates, via a processor on message retrieval by a message recipient, a digital signature of a message originator of a message as a first-tier validation of the message. At block 504, the process 500 extracts, in response to a successful first-tier validation of the digital signature of the message originator, a transaction token and a message originator identifier from a message payload of the message. At block 506, the process 500 initiates, as a second-tier validation of the message with a verification service within a secure messaging environment of the message originator, communication with the verification service within the secure messaging environment of the message originator using the extracted transaction token and the extracted message originator identifier to confirm whether the secure messaging environment of the message originator generated the transaction token and inserted the transaction token into the message payload. At block 508, the process 500 determines results of the second-tier validation of the message with the verification service within the secure messaging environment of the message originator.

Figure 6:
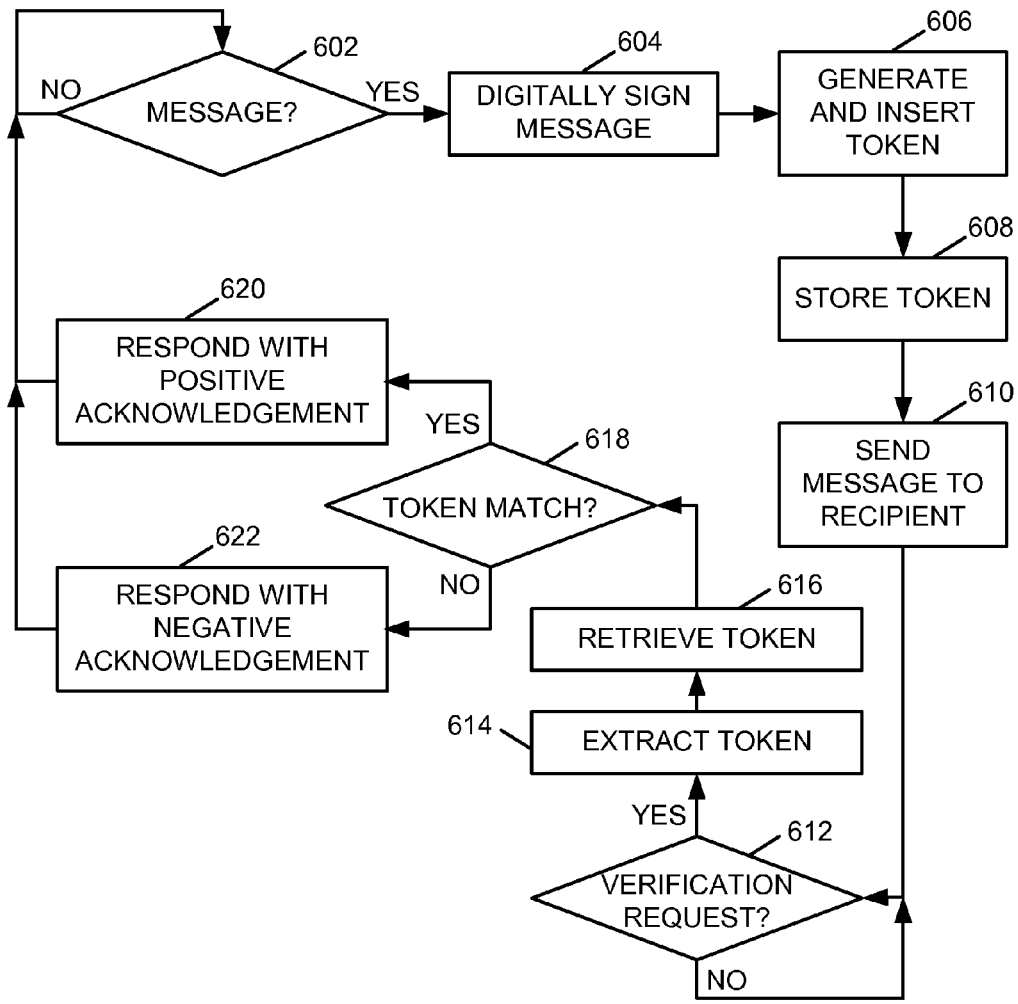
FIG. 6 is a flow chart of an example of an implementation of a process for automated message originator token verification at a message originator device according to an embodiment of the present subject matter.

FIG. 6 is a flow chart of an example of an implementation of a process 600 for automated message originator token verification at a message originator device, such as one of the computing device_1 102 through the computing device_N 106. FIG. 6 illustrates multi-threaded processing within the single example for ease of illustration and description purposes. As such, message origination and verification requests, which may be handled by different threads in different processes within the given implementation, are combined within the process 600. However, the combination of the respective processing activities within the example process 600 does not suggest a synchronous nature between message origination and verification requests. Alternatively, the multi-threaded processing of the process 600 may be combined into a single process as illustrated within the present example, as appropriate for a given implementation.

At decision point 602, the process 600 makes a determination as to whether a request to originate (send) a message has been detected, such as from an application. In response to determining that a request to originate a message has been detected, process 600 digitally signs the message at block 604. At block 606, the process 600 generates and inserts a transaction token into the message payload. At block 608, the process 600 stores the transaction token for later use in association with a verification request. At block 610, the process 600 sends the message to the intended recipient. For multi-threaded processing, the process 600 may return to decision point 602 and iterate as described above. Within the present example, the process 600 waits for a verification request at decision point 612.

Response to determining that a verification request has been detected at decision point 612, process 600 extracts the transaction token from the verification request message at block 614. At block 616, the process 600 retrieves the stored transaction token from the transaction store. At decision point 618, the process 600 makes a determination as to whether the extracted token matches the transaction token retrieved from storage. It should be noted that where multiple messages have been originated and multiple transaction tokens have been stored for verification purposes, the process 600 may retrieve multiple tokens at block 616 and compare the retrieved multiple tokens with the extracted token at decision point 618.

In response to determining that a token match has been identified at decision point 618, the process 600 responds to the verification request with a positive acknowledgment (ACK) at block 620. Alternatively, in response to determining that a token match has not been identified at decision point 618, the process 600 responds to the verification request with a negative acknowledgment (NACK) at block 622. In response to either sending the positive acknowledgment at block 620 or sending the negative acknowledgment at block 622, the process 600 returns to decision point 602 and iterates as described above.

As such, the process 600 represents processing of two distinct threads. The first thread originates messages, generates transaction tokens, and stores the transaction tokens for later verification. The second thread responds to verification requests by comparing transaction tokens extracted from the verification requests with previously-stored transaction tokens, and sending a positive or negative acknowledgment based upon the results of the comparison.

Figure 7:
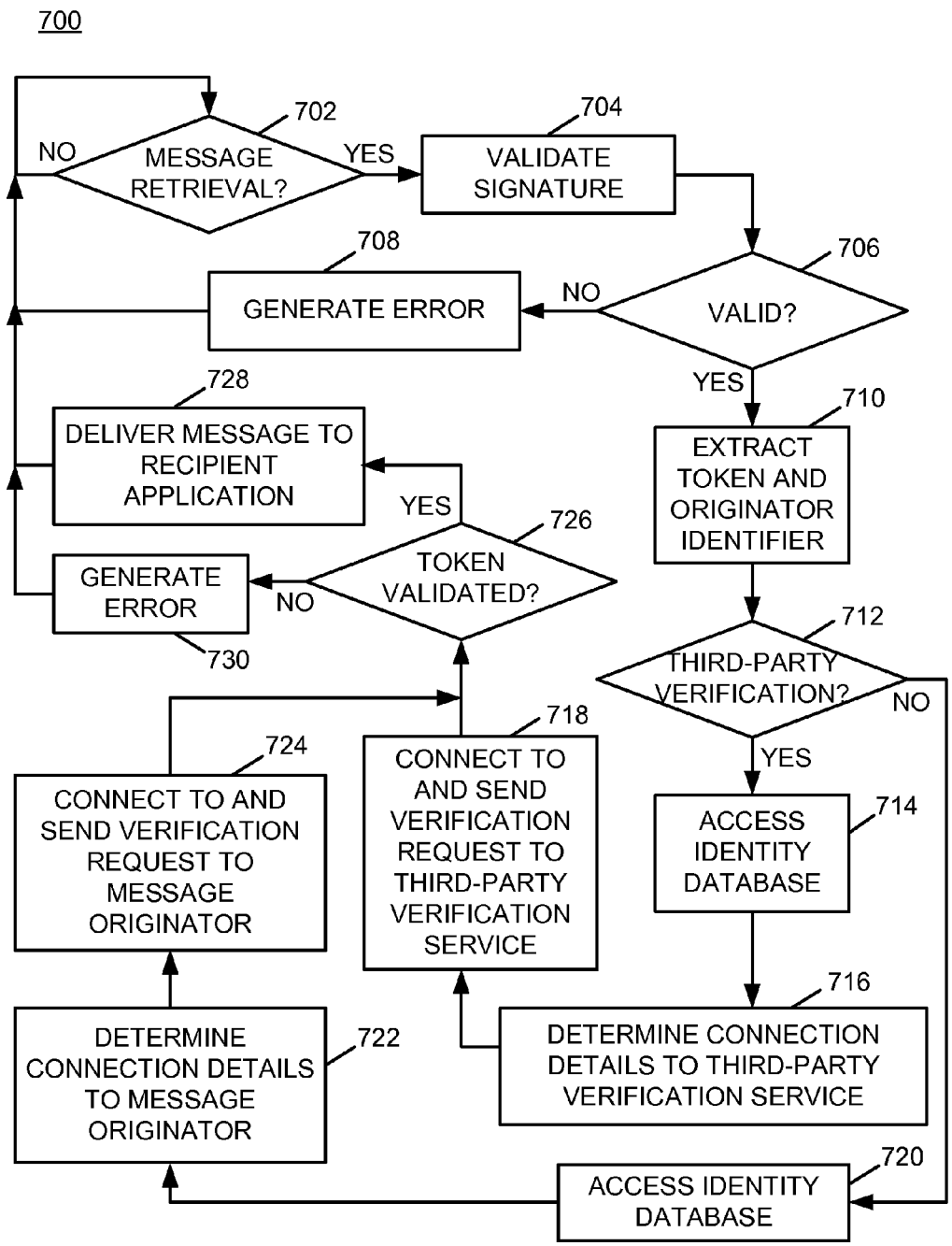
FIG. 7 is a flow chart of an example of an implementation of a process for automated message originator token verification at a message recipient device according to an embodiment of the present subject matter.

FIG. 7 is a flow chart of an example of an implementation of a process 700 for automated message originator token verification at a message recipient device, such as one of the computing device_1 102 through the computing device_N 106. The process 700 implements a two-tier validation of a received message on message retrieval by a message recipient. At decision point 702, the process 700 makes a determination as to whether message retrieval by the message recipient has been detected. In response to determining that message retrieval by the message recipient has been detected, the process 700 validates a signature within the message as a first-tier validation of the message a block 704. At decision point 706, the process 700 makes a determination as to whether the signature is valid. In response to determining that signature is not valid, the process 700 generates an error at block 708, and returns to decision point 702 and iterates as described above.

In response to determining that the signature is valid at decision point 706, the process 700 initiates a second-tier validation of the message with the verification service within the secure messaging environment of the message originator, and extracts a transaction token and a message originator identifier from the message payload at block 710. At decision point 712, the process 700 makes a determination as to whether to utilize a third-party verification service, such as the third-party verification service server 110, or to directly interact with the verification service within the secure messaging environment of the message originator for transaction token validation/verification.

In response to determining at decision point 712 to utilize a third-party verification service, the process 700 accesses an identity database, such as the identity database 112 or 112-A, to identify and determine connection information for the third-party verification service at block 714. As such, the process 700 determines, using a configured identity repository separate from the message, connection information of the third-party verification service usable to communicate with the third-party verification service. At block 716, the process 700 determines connection details to the third-party verification service. At block 718, the process 700 establishes a connection with/connects to the third-party verification service, and sends a verification request including both the extracted transaction token and the extracted message originator identifier to the third-party verification service. Additional processing associated with a response from the third-party verification service will be deferred and described in more detail below. As described in more detail below, the third-party verification service utilizes the extracted transaction token and the extracted message originator identifier to communicate with the verification service within the secure messaging environment of the message originator to determine whether the secure messaging environment of the message originator generated the transaction token and inserted the transaction token into the message payload.

In response to determining at decision point 712 not to utilize a third-party verification service and to directly interact with the message originator for transaction token validation/verification, the process 700 accesses an identity database, such as the identity database 112 or 112-A, to identify and determine connection information for the message originator at block 720. At block 722, the process 700 determines connection details to the message originator. At block 724, the process 700 connects to the message originator and sends a verification request, including the extracted transaction token, to the message originator.

For purposes of the present example, it is assumed that a response is received from the third-party verification service in response to the verification request sent at block 718 or from the message originator in response to the verification request sent at block 724. As such, additional error processing for message reception failure is omitted for brevity.

In response to either connecting to and sending the verification request including both the extracted transaction token and the extracted message originator identifier to the third-party verification service at block 718, or in response to connecting to and sending the verification request including the extracted transaction token to the message originator at block 724, the process 700 makes a determination at decision point 726 as to whether the transaction token has been validated/verified by either the third-party verification service or the by the verification service within the secure messaging environment of the message originator, respectively. As such, the process 700 may determine the results of the second-tier validation of the message with the verification service within the secure messaging environment of the message originator. Determining the results of the second-tier validation may include receiving an indication of whether the secure messaging environment of the message originator generated the transaction token and inserted the transaction token into the message payload. A response may be received from the third-party verification service indicating whether the secure messaging environment of the message originator generated the transaction token and inserted the transaction token into the message payload. Alternatively, a response may be received from the verification service within the secure messaging environment of the message originator indicating whether the secure messaging environment of the message originator generated the transaction token and inserted the transaction token into the message payload.

In response to determining at decision point 726 that a response has been received indicating that the transaction token is valid (e.g., that the secure messaging environment of the message originator generated the transaction token and inserted the transaction token into the message payload), the process 700 delivers the message to the recipient application at block 728. In response to determining at decision point 726 that a response has been received indicating that the transaction token is not valid (e.g., that the secure messaging environment of the message originator did not generate the transaction token and did not insert the transaction token into the message payload), the process 700 generates an error at block 730. The process 700 also prevents delivery of the message to the message recipient in response to determining that the message originator did not generate the transaction token and did not insert the transaction token into the message payload. In response to either delivering the message to the recipient application at block 728 or generating the error at block 730, the process 700 returns to decision point 702 and iterates as described above.

As such, the process 700 operates at a message recipient data protection module, and more specifically at an originator verification module, to perform message originator token verification prior to delivering the message to the recipient application. The process 700 extracts a transaction token and originator identifier from a payload of a received message and either utilizes a third-party verification service or operates directly to connect to the message originator and validate the transaction token. In response to transaction token validation, the process 700 delivers the message to the recipient application.

Figure 8:
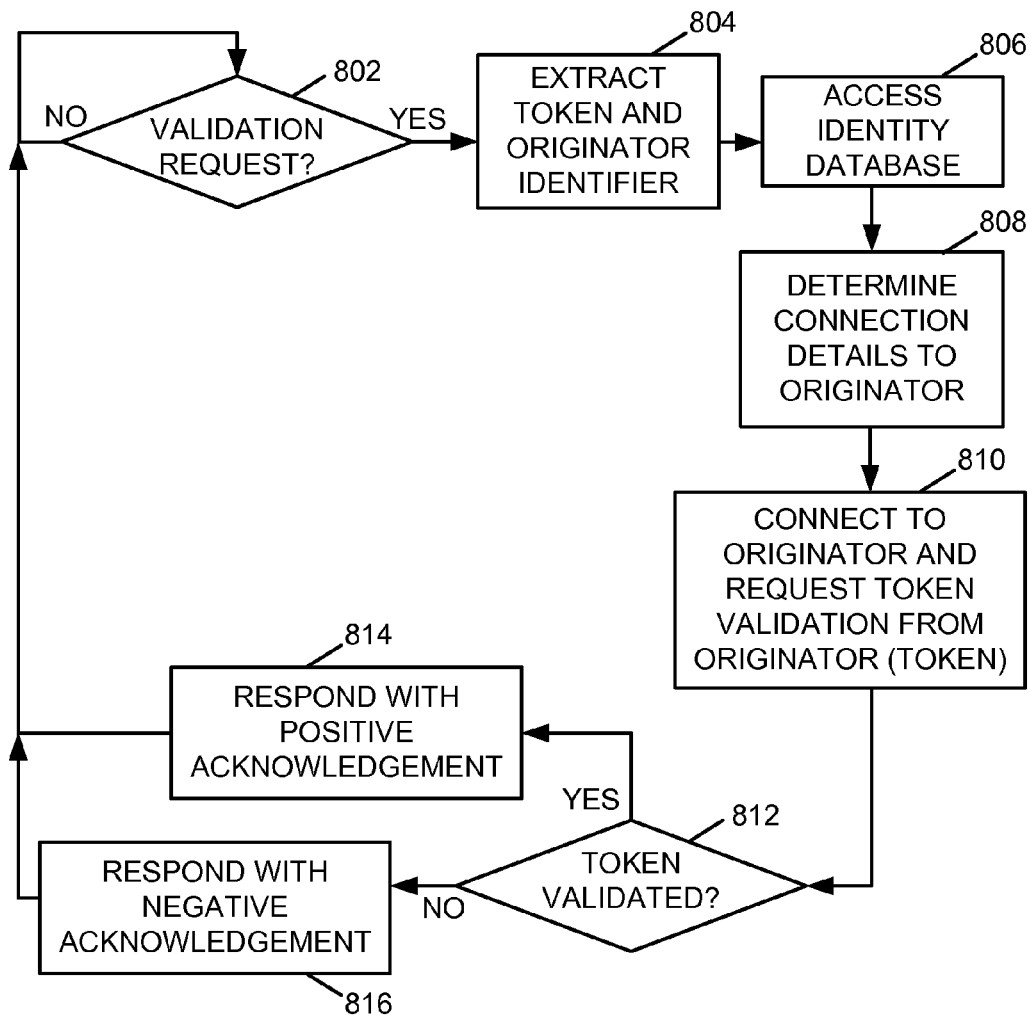
FIG. 8 is a flow chart of an example of an implementation of a process for automated message originator token verification at a third-party verification service device according to an embodiment of the present subject matter.

FIG. 8 is a flow chart of an example of an implementation of a process 800 for automated message originator token verification at a third-party verification service device, such as the third-party verification service server 110. At decision point 802, the process 800 makes determination as to whether a transaction token validation request has been detected. In response to determining that a transaction token validation request has been detected, the process 800 extracts a transaction token and a message originator identifier from a payload of the validation request at block 804. At block 806, the process 800 accesses an identity database, such as the identity database 112 or 112-B, to identify and determine connection information for the message originator. At block 808, the process 800 determines connection details to the message originator. At block 810, the process 800 connects to the message originator, and sends a verification request including the extracted transaction token to the message originator. For purposes of the present example, it is assumed that a response is received from the message originator in response to the verification request sent at block 810. As such, additional error processing for message reception failure is omitted for brevity.

At decision point 812, the process 800 makes a determination as to whether the transaction token has been validated by the message originator. In response to determining at decision point 812 that a response has been received indicating that the transaction token is valid, the process 800 responds with a positive acknowledgment (ACK) to the originator verification module of the recipient application at block 814. In response to determining at decision point 812 that a response has been received indicating that the transaction token is not valid, the process 800 responds with a negative acknowledgment (NACK) to the originator verification module of the recipient application at block 816. In response to either responding with a positive acknowledgment at block 814 or responding with the negative acknowledgment at block 816, the process 800 returns to decision point 802 and iterates as described above.

As such, the process 800 responds to validation requests from originator verification modules associated with message recipients, and connects to message originators on behalf of the message recipients to request validation of transaction tokens. The process 800 forwards the results of the requested transaction token verification to the requesting originator verification module. Accordingly, message originator token verification may be enhanced by use of the third-party service.

As described above in association with FIG. 1 through FIG. 8, the example systems and processes provide message originator token verification. Many other variations and additional activities associated with message originator token verification are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    validating, via a processor on message retrieval by a message recipient, a digital signature of a message originator of a message as a first-tier validation of the message;
    extracting, in response to a successful first-tier validation of the digital signature of the message originator, a transaction token and a message originator identifier from a message payload of the message;
    initiating, as a second-tier validation of the message with a verification service within a secure messaging environment of the message originator, communication with the verification service within the secure messaging environment of the message originator using the extracted transaction token and the extracted message originator identifier to confirm whether the secure messaging environment of the message originator generated the transaction token and inserted the transaction token into the message payload; and
    determining results of the second-tier validation of the message with the verification service within the secure messaging environment of the message originator.

2. The method of claim 1, further comprising determining whether to utilize a third-party verification service to communicate with the verification service within the secure messaging environment of the message originator as part of the second-tier validation of the message.

3. The method of claim 2, further comprising, in response to determining to utilize the third-party verification service to communicate with the verification service within the secure messaging environment of the message originator as part of the second-tier validation of the message:
    determining, using a configured identity repository separate from the message, connection information of the third-party verification service usable to communicate with the third-party verification service; and
    where initiating, as the second-tier validation of the message with the verification service within the secure messaging environment of the message originator, communication with the verification service within the secure messaging environment of the message originator using the extracted transaction token and the extracted message originator identifier to confirm whether the secure messaging environment of the message originator generated the transaction token and inserted the transaction token into the message payload comprises:
        establishing a connection with the third-party verification service using the determined connection information of the third-party verification service; and
        sending a token verification request to the third-party verification service comprising the extracted transaction token and the extracted message originator identifier over the established connection, where the third-party verification service utilizes the extracted transaction token and the extracted message originator identifier to communicate with the verification service within the secure messaging environment of the message originator to determine whether the secure messaging environment of the message originator generated the transaction token and inserted the transaction token into the message payload.

4. The method of claim 3, where determining the results of the second-tier validation of the message with the verification service within the secure messaging environment of the message originator comprises receiving a response from the third-party verification service indicating whether the secure messaging environment of the message originator generated the transaction token and inserted the transaction token into the message payload.

5. The method of claim 2, further comprising, in response to determining not to utilize the third-party verification service to communicate with the verification service within the secure messaging environment of the message originator as part of the second-tier validation of the message:
    determining, using a configured identity repository separate from the message, connection information of the verification service within the secure messaging environment of the message originator usable to communicate with the verification service within the secure messaging environment of the message originator; and
    where initiating, as the second-tier validation of the message with the verification service within the secure messaging environment of the message originator, communication with the verification service within the secure messaging environment of the message originator using the extracted transaction token and the extracted message originator identifier to confirm whether the secure messaging environment of the message originator generated the transaction token and inserted the transaction token into the message payload comprises:
        establishing a connection with the verification service within the secure messaging environment of the message originator using the determined connection information of the verification service within the secure messaging environment of the message originator; and sending a token verification request to the verification service within the secure messaging environment of the message originator comprising the extracted transaction token over the established connection.

6. The method of claim 5, where determining the results of the second-tier validation of the message with the verification service within the secure messaging environment of the message originator comprises receiving a response from the verification service within the secure messaging environment of the message originator indicating whether the secure messaging environment of the message originator generated the transaction token and inserted the transaction token into the message payload.

7. The method of claim 1, further comprising, in response to determining that the results of the second-tier validation of the message with the verification service within the secure messaging environment of the message originator comprise an indication that the secure messaging environment of the message originator generated the transaction token and inserted the transaction token into the message payload, delivering the message to the message recipient.

8. The method of claim 1, further comprising, in response to determining that the results of the second-tier validation of the message with the verification service within the secure messaging environment of the message originator comprise an indication that the secure messaging environment of the message originator did not generate the transaction token and did not insert the transaction token into the message payload:
  generating an error message; and
  preventing delivery of the message to the message recipient.

* * * * *